(12) United States Patent
Early (10) Patent No.: US 7,353,847 B2
(45) Date of Patent: Apr. 8, 2008

(54) METHOD OF LOADING A PARTICULATE SOLID INTO A VESSEL

(75) Inventor: Simon Early, London (GB)

(73) Assignee: Davy Process Technology Limited, London (GB)

(*) Notice: Subject to any disclaimer, the term of this patent is extended or adjusted under 35 U.S.C. 154(b) by 729 days.

(21) Appl. No.: 10/481,147

(22) PCT Filed: Jun. 21, 2002

(86) PCT No.: PCT/GB02/02895

§ 371 (c)(1),
(2), (4) Date: Apr. 28, 2004

(87) PCT Pub. No.: WO03/008086

PCT Pub. Date: Jan. 30, 2003

(65) Prior Publication Data

US 2004/0191136 A1    Sep. 30, 2004

(30) Foreign Application Priority Data

Jun. 21, 2001  (GB) ................. 0115243.8

(51) Int. Cl.
*B65B 1/04*    (2006.01)
(52) U.S. Cl. .................. 141/9; 141/102; 141/198; 422/219
(58) Field of Classification Search .............. 141/1, 141/9, 100, 102, 198; 422/218–223
See application file for complete search history.

(56) References Cited

U.S. PATENT DOCUMENTS

| 2,976,132 | A | * | 3/1961 | Dinwiddie et al. ......... 422/220 |
|---|---|---|---|---|
| 4,022,255 | A | | 5/1977 | Pegels et al. |
| 4,225,562 | A | * | 9/1980 | Anderson ................. 422/188 |
| 4,321,234 | A | | 3/1982 | Ohsaki et al. |
| 4,421,723 | A | | 12/1983 | Farnham |
| 4,452,761 | A | | 6/1984 | Farnham |
| 4,734,264 | A | | 3/1988 | Vollhardt et al. |
| 4,755,362 | A | | 7/1988 | Zardi |
| 5,184,386 | A | | 2/1993 | Zardi et al. |
| 5,520,891 | A | | 5/1996 | Lee |
| 5,585,075 | A | | 12/1996 | Takano et al. |
| 5,869,011 | A | | 2/1999 | Lee |

FOREIGN PATENT DOCUMENTS

DE    196 34 455 A1    3/1998

OTHER PUBLICATIONS

International Search Report for International Application PCT/GB02/02895, dated Sep. 27, 2002, 4 pages.

* cited by examiner

*Primary Examiner*—Timothy L. Maust
(74) *Attorney, Agent, or Firm*—Senniger Powers LLP (57) ABSTRACT

A method of loading a granulated solid into a vessel having a containment zone for the granulated solid. The method comprises providing in a bottom portion of the containment zone a first substantially vertical rigid columnar portion having a horizontal cross section large enough to accommodate an operative's body. Support means is associated with the substantially vertical rigid columnar portion. Granulated solid is charged into the containment zone under control of the operative so as to distribute granulated solid around the substantially vertical rigid columnar portion. A further substantially vertical rigid columnar portion having a similar horizontal cross section to that of the first columnar portion is positioned on top of the first columnar portion. These steps are repeated a sufficient number of times until the desired amount of granulated solid has been charged to the containment zone.

18 Claims, 5 Drawing Sheets

METHOD OF LOADING A PARTICULATE SOLID INTO A VESSEL

This invention relates to a method of loading a particulate solid into a vessel. More particularly it relates to a method of loading a particulate solid, such as a catalyst, into a solids containment zone of a vessel, for example, a fixed bed reactor. The invention is of particular applicability to charging of a particulate catalyst into a fixed bed reactor containing tubes.

Fixed bed reactors containing heat exchange tubes to control reaction temperatures are used in a number of exothermic and endothermic reactions. A variety of designs of fixed bed reactor has been proposed. Amongst these are axial flow reactors as exemplified by U.S. Pat. No. 4,734,264 (Vollhardt et al.). Another design is a radial flow reactor; an example of such a design is that disclosed in U.S. Pat. No. 4,321,234 (Ohsaki et al.). Annular flow reactors have also been proposed, examples being the designs described in U.S. Pat. No. 4,755,362 (Zardi) and U.S. Pat. No. 5,184,386 (Zardi et al.). A cross flow reactor is another type of design, a typical example of which is taught in U.S. Pat. No. 5,520,891 (Lee). Segmental flow reactors have also been proposed. A combination of two or more of these designs in one vessel is also possible.

In such reactors the tubes can be arranged as coils, serpentines, straight axial tubes, bayonets or U-tubes or any other useful arrangement. Serpentine coils are shown, for example, in U.S. Pat. No. 5,869,011 (Lee). However, the presence of the tubes and of any associated tube supports and baffles makes it difficult and time consuming to load catalyst to the space around the tubes in any other practical way than pouring from the top. This means that consistent, complete and even distribution of the catalyst cannot be assured to all the void parts of the reactor as the catalyst has to flow by gravity to fill these spaces. In an attempt to overcome this, some operators pour the catalyst in a pre-determined sequence to different parts of the top of large diameter reactors rather than in one location.

There is no way of checking the completeness of loading of a tube-containing reactor with catalyst or of checking the actual loading density of the catalyst other than by dead reckoning based on the amount of catalyst loaded.

The importance of even loading of catalysts is emphasised by M. V. Twigg in his book "Catalyst Handbook", $2^{nd}$ Edition, Wolfe Publishing Ltd. (1989). On page 151 it is stated:

"There are two general rules for loading catalysts into vessels:
(a) the catalysts should not have a free fall of more than 50-100 cm and
(b) the catalyst must be distributed evenly as the bed is filled.

The distance that a catalyst can fall without serious damage depends on its strength and shape. A hard spherical granule will withstand dropping better than a soft angular pellet or extrudate."

On pages 152 to 153 he states:

"A deep, narrow bed is the easiest shape to charge satisfactorily, and irregularities are more likely to be averaged out along the direction of the gas flow. Extra care is required with wide beds because it is difficult to distribute the catalyst evenly over a large area. Radial-flow beds are particularly susceptible to irregular packing and uneven gas flow. The result of irregular packing and concomitant uneven gas flow can be particularly pronounced in reactors which depend on the gas flow to control the temperature of the bed. Examples include ammonia converters, the hydrogenation of acetylene in the presence of ethylene, and also some types of shift converter where the reaction is not expected to reach equilibrium. High local temperatures will occur in regions of low flow if the reaction proceeds further than is desired. Such high-temperature regions cause further resistance to flow, which can aggravate the imbalance within the bed even more."

On page 155, Twigg says:

"Ammonia synthesis catalyst requires special care in charging because of the irregular shape of the granules, which can lead to a wide variation in bulk density."

As pointed out above, each individual catalyst type has a susceptibility to breakage as a result of free fall. This provides a constraint to the height of the reactor. For most catalysts a free fall of more than 50 to 100 cm should not be used, although some strong catalysts, such as ICI Catalyst 35-4, may be allowed a free fall of up to three metres, according to their manufacturers (although in practice it may be possible to drop catalyst granules from a greater height than that recommended by the catalyst manufacturer without running into problems caused by damage to the catalyst granules).

For fixed-bed reactors which do not contain internal furniture, such as heat exchange tubes, supports therefor, distributors, and baffles, a variety of methods can be used to reduce breakage by free fall where access is available, such as lowering individual buckets and the like, or the use of a canvas or rigid hose connected to a hopper or bulk container. Frequent raking may be needed to level the catalyst. A spinning device can be used that lays down consecutive level layers of catalyst rather than mounds of catalyst. However, these are not practical methods for fixed-bed reactors containing internal furniture, such as heat exchange tubes. Thus filling from the top is generally used so that the catalyst may experience free fall, although the free fall distance experienced by many of the catalyst granules may be effectively somewhat reduced as a result of collisions with the internal furniture as they fall towards the bottom of the catalyst containment zone. Nevertheless this still means that the height of the reactor must be limited since otherwise unacceptable damage to the catalyst particles may ensue. Thus the maximum total catalyst bed height in a reactor with internal furniture has a practical upper limit.

This height limitation becomes a major factor in the design of larger capacity plants requiring correspondingly larger volumes of catalyst. If the catalyst bed height is fixed by this constraint, then the extra volume has to be accommodated by a disproportionately larger increase in cross-sectional area of the catalyst bed. This means lower reactant velocities which in turn reduce heat transfer at the tubes so that relatively more heat exchange tubes are required, so that a further increase in vessel diameter is necessary. As the reactor wall thickness is a function of diameter, reactor weight and cost will increase disproportionally in such an enlarged diameter vessel compared to a reactor where the extra volume can be at least partially accommodated by an increase in catalyst bed height.

An added disadvantage of an increase in vessel diameter is that vessel transportation difficulties are usually related to the diameter of the vessel, while overall height of the vessel is rarely a limitation, if the vessel is laid on its side for transportation.

These factors are especially true for radial flow reactors, in which the velocity across the heat exchange tubes is critical for temperature control. Thus, for such reactors, any extra capacity would ideally be best provided by making the reactor taller and retaining the same diameter and tube arrangement, rather than by increasing the reactor diameter. If this could be done, the pressure drop across the reactor would be unchanged, allowing significant standardisation of reactor design for different capacities. In this case the single major change in design for a larger capacity plant would be a change of height of the reactor vessel, while the cross sectional area of the reactor would be essentially the same for all capacities of reactor vessel.

Apart from direct pouring of catalyst from the top of the vessel, it is alternatively possible to use chutes or hoses inserted into the tube assembly, or to lower flexible socks or the like filled with catalyst into the vessel. All of such methods use gravity. However, if the vessel contains many heat exchange tubes and their associated supports, and possibly also baffles, it is extremely difficult to ensure that satisfactory loading of the vessel with uniform distribution of catalyst will take place by one of these methods.

Alternatively, when the catalyst has sufficient strength, pneumatic conveying can be used to inject catalyst through nozzles on the reactor wall. However, this is impractical when the vessel contains heat exchange tubes, supports and/or baffles. Moreover this method would have the effect of inducing segregation of the catalyst particles within the reactor voids as the larger particles would tend to fall out first while the smaller particles would be carried further before falling out. Although pneumatic conveying can speed up fixed bed loading, when the catalyst is sufficiently strong, the catalyst must not all be poured into the vessel at one spot with the resulting heap being raked level. Otherwise the particles tend to segregate with small particles and dust staying mainly in the centre of the heap and restricting gas flow in this portion of the vessel, while larger pieces roll to the edge where the gas velocity will be higher.

Fluidisation of catalyst particles by a suitable liquid as a means of filling a reactor is described in U.S. Pat. No. 4,022,255 (Pegels et al.). However, aside from cases where the catalyst must be kept dry, this specification indicates that water is not sufficiently viscous to be suitable, which thereby limits the choice of acceptable fluid. Clearly the fluid chosen must be compatible with the proposed reaction system. The method proposed is applicable to loading non-tubular fixed beds, although mention is made of filling spaces below conical plates by reducing liquid flow from time to time. The main problem with this method, assuming a suitable compatible fluid can be found, is that in order to convey the particles they are fluidised and thus conveyed at a lower density before being allowed to settle by reducing liquid flow. With the complexity of tubes, tube supports and baffles in a tubular fixed bed reactor, it cannot be certain that all the required parts of the reactor will be filled with catalyst particles. In addition, considerable segregation of particles by size will inevitably occur, as discussed, for example, at column 3 line 29 et seq. of this publication in relation to removal of fines and undersize particles. The method described also requires additional tanks, pumps and other equipment.

In U.S. Pat. Nos. 4,421,723 and 4,452,761 (Farnham) there is disclosed a fixed bed radial flow reactor with a perforated central pipe, which is in turn surrounded by a screen.

The use of a central caisson is described in U.S. Pat. No. 5,585,075 (Takano et sl.) as an aid to locate a catalyst having particles of a given size in the centre of an outer bed of catalyst particles having a different particle size in an adiabatic fixed bed reactor. The caisson is lifted as filling proceeds so as to lead to a completely filled reactor.

There is a need for an improved method of loading with granules of a frangible granulated solid a vessel having internal furniture such as heat exchange tubes, supports for such tubes and/or baffles which permits the formation in the vessel of a bed of the solid having a depth greater than the allowable free fall height of the solid. In addition there is a need to provide a method of charging a reactor containing internal furniture, such as heat exchange tubes, supports for such tubes, gas distributors, baffles, and the like, wherein close monitoring of the loading procedure is possible thus minimising problems due to improper loading of the reactor with catalyst. There is a further need to provide a method of loading a radial flow reactor with an increased volume of catalyst so as to permit the design of a radial flow reactor with increased throughput capacity without significantly increasing its diameter. In addition there is a need for providing a method of loading a catalytic reactor containing heat exchange tubes with a frangible catalyst without significant risk of damage to the catalyst while permitting the formation of catalyst beds that are significantly deeper than the allowable free fall height of the catalyst.

The invention accordingly seeks to provide a method of loading a frangible granulated solid into a vessel having internal furniture such as heat exchange tubes, supports for such tubes and/or baffles so as to form in the vessel a bed of the solid that has a significantly greater depth than the free fall height of the solid. In addition the invention seeks to provide a method of loading a reactor with a catalyst or other frangible granulated material wherein close monitoring of all stages of the loading procedure is possible thereby leading to optimum loading of the reactor with the solid. Moreover the invention seeks to provide a method of loading a radial flow reactor with an increased volume of catalyst so as to increase the throughput capacity of the reactor without significantly increasing its diameter. Furthermore the invention seeks to provide a method of loading a catalytic reactor containing heat exchange tubes with a frangible catalyst without significant risk of damage to the catalyst while permitting the formation of catalyst beds that are significantly taller than the free fall height of the catalyst.

According to the present invention there is provided a method of loading a granulated solid into a vessel having a containment zone for the granulated solid, the method comprising:

(a) providing in a bottom portion of the containment zone a first substantially vertical rigid columnar portion having a horizontal cross section large enough to accommodate an operative's body;

(b) providing support means associated with the substantially vertical rigid columnar portion upon which an substantially vertical rigid columnar portion including a floor means upon which an operative can stand within the substantially vertical rigid columnar portion to supervise at close hand loading of the containment zone with the granulated solid;

(c) charging granulated solid into the containment zone under control of an operative standing on the floor means within the rigid columnar portion so as to distribute granulated solid around the substantially vertical rigid columnar portion;

(d) discontinuing charging of the granulated solid into the containment zone before the upper surface of the granulated solid in the containment zone reaches the top of the substantially vertical rigid columnar portion;

(e) positioning on top of the first conduit portion a further substantially vertical rigid columnar portion having a similar horizontal cross section to that of the first columnar portion, thereby forming with the first columnar portion a substantially vertical column within the reactor; and (f) repeating steps (b) to (e) a sufficient number of times until the desired amount of granulated solid has been charged to the containment zone.

The first substantially columnar portion, and preferably also each other columnar portion, typically has a substantially circular horizontal cross section with a diameter of from about 18 inches (about 0.46 metres) to about 24 inches (about 0.61 metres). Preferably the columnar portions are hollow so that the resulting column is also hollow. Typically the columnar portions each have a height of no more than about 10 feet (about 3.05 metres), and more usually no more than about 6 feet (about 1.83 metres). This height will usually be chosen so that an operative standing on the support means can supervise closely loading of the solid into the containment zone and also manually direct discharge of the solid into the containment zone without risk of exceeding the maximum recommended free fall height for the solid. Hence the height of the columnar portions may vary in dependence on the frangibility of the granules of solid being loaded.

In the method of the invention there is included the step of providing support means associated with the substantially vertical rigid columnar portion upon which an operative can stand. In a particularly preferred method the first and each other columnar portion is open topped, in which case such support means located at a distance below the top of the uppermost rigid columnar portion such that the upper part of the operative's body, normally from about the waist upwards, projects above the top of the uppermost columnar portion.

The vessel may be designed as an axial flow reactor, a radial flow reactor, an annular flow reactor, a cross flow reactor, a segmental flow reactor, or a combination of two or more thereof.

Conveniently the rigid columnar portions are substantially circular in horizontal cross section. They may have an imperforate wall so as to form a gas impermeable column extending from the bottom to the top of the containment zone. Alternatively the rigid columnar portions may be hollow and have a perforated or foraminous wall so as to form a conduit with a gas permeable wall extending substantially from the bottom to the top of the containment zone.

Step (c) may comprise the steps of providing a flexible conduit having a feed end and a delivery end, feeding granulated solid through the delivery conduit from the feed end to the delivery end, and manually directing the delivery end so as to discharge granulated solid to a desired location outside the substantially vertical open topped conduit portion. This discharge of the granulated solid will preferably be conducted such that the solid does not undergo free fall through a free fall height greater than that recommended by the supplier or manufacturer of the solid or a modest multiple thereof, e.g. up to 1.5 times the manufacturer's recommended maximum safe free fall height. Such a feed conduit used by the operative can comprise a sock, a chute, or a sock with a chute arranged to be fed by the lower end of the sock. Moreover in step (c) a deflector shield can be fitted to the top of the uppermost rigid columnar portion, if this is hollow and open topped, in order to prevent granulated solid falling into the respective rigid columnar portion. The deflector shield can be a frusto-conical deflector shield fitted to the top of the uppermost rigid columnar portion with the narrower end of the deflector shield uppermost. Such a deflector shield may be constructed so as to provide the support means within the substantially vertical open topped rigid columnar portion upon which an operative can stand. Hence the deflector shield can be formed as part of a bucket like device which is supported at the open top of the uppermost columnar portion and which enables the operative to stand within the bucket like device with the upper half of his body, typically from about the waist upwards, extending above the deflector shield.

The columnar portions may be hollow and may be open topped. They will generally be open topped if the conduit eventually formed by the columnar portions is to be used as an inlet passageway for the reactants or as an outlet passageway for a reaction product stream. The support means upon which an operative can stand may comprise part of a separate filling platform positioned on or in the uppermost columnar portion. Alternatively the support means can be integrally formed with the columnar portion. In this case a floor can be provided at a convenient height below the open top of the conduit portion which is secured to the columnar portion and remains in place after the reactor comes on stream. If the columnar portions are hollow and have a perforate or foraminous wall so as to form a conduit which is to be used as an inlet passageway for reactants or as an outlet passageway for a reaction product mixture, then the floor will be perforate, being made, for example, from expanded metal mesh. If, on the other hand, the column has an imperforate wall and is intended to be gas imperforate as, for example, in the case of an axial flow reactor, then the floor will normally be solid.

In addition the first columnar portion, as well as each other columnar portion, can be provided, if it is hollow, with an integral deflector shield, e.g. a frusto-conical deflector shield, at its upper end to reduce or substantially eliminate the risk of catalyst granules entering the respective conduit portion during loading of the catalyst under its close supervision of an operative standing on the support means. Again the deflector shield would remain in place, in this case, after the reactor comes on stream.

Usually the containment zone will contain internal furniture selected from heat exchange tubes, supports therefor, and baffles.

Preferably the granulated solid is a granulated catalyst, for example, a methanol synthesis catalyst.

Although the method of the invention can be successfully practised so as to form a single substantially vertical column extending upwards from a bottom portion of the solids containment zone, it will of course be appreciated that, in some circumstances, it may be preferable to form two or more such columns within the vessel so as to permit satisfactory loading of the solids containment zone with the particulate solid. In such circumstances the two or more columns will normally be positioned on and/or symmetrically around the vertical axis of the containment zone.

The invention further envisages a reaction vessel defining a catalyst containment zone containing a charge of a granulated catalyst, the catalyst containment zone having therein a substantially vertical column of substantially uniform cross section throughout its height which extends upwards from a bottom portion of the catalyst containment zone and is formed from a plurality of separate columnar portions assembled one on top of another, each having a horizontal cross section large enough to accommodate an operative's body and a height of not more than about 10 feet (about 3.05 metres), the column being substantially devoid of catalyst granules. Such a reaction vessel can be provided with one or more inlets for reactants, cold shots, and the like, as well as with one or more outlets for a reaction product stream. In addition, such a reaction vessel can be provided with internal furniture such as heat exchange tubes, supports for heat exchange tubes, distributors, and/or baffles.

It will thus be seen that the invention provides an improved reactor design and method of loading catalyst that is not limited by catalyst free fall height, that allows frequent inspection of the extent of void filling, that provides a more homogeneous bed by providing uniform particle distribution and random orientation of the particles, that allows checks of loading density to made by dead reckoning during the filling process, that allows corrections to loading to be made as filling proceeds, that allows inspection and repair of tubes and tube assembly during catalyst replacement, that allows significant standardisation of reactor design, and that allows economical modifications to increase existing reactor capacity. In essence, a central core of the reactor, free of tubes, is used to gain access to load catalyst, to ensure voids are filled, to check loading density, and the like. As filling proceeds, the core is completed by adding imperforate sections, or perforate sections for radial flow reactors, until the catalyst containment zone is sufficiently filled. As they are added, the sections provide a place to stand for an operative to supervise and check filling as it proceeds. The proportion of the catalyst bed lost by this central core is minor especially for large reactors. For radial flow reactors the loss is even smaller or there is no loss, as the central core can become a central distributor for reactants or a central collector for a reaction product stream.

Because the depth of a catalyst bed is no longer limited by the frangibility of the catalyst granules, that is to say by the maximum safe free fall height of the catalyst granules, it becomes possible to construct reactors containing fixed beds of catalyst which are much taller than has heretofore been possible. Instead the limiting factor on the height of the reactor now becomes the crushing strength of the catalyst under static load. Depending upon the crushing strength of the catalyst it now becomes possible to construct and operate reactors with fixed beds of catalyst that are up to about 100 feet (about 30.48 metres) or more, e.g. up to about 150 feet (about 45.72 metres) or more, if the catalyst has a high enough crushing strength.

In order that the invention may be clearly understood and readily carried into effect, a preferred method of loading a reactor with catalyst in accordance with the invention will now be described, by way of example only, with reference to the accompanying diagrammatic drawings, wherein.

It will be appreciated by those skilled in the art that, since the drawings are diagrammatic, many items of equipment have been omitted for the sake of simplicity. Such items include, for example, individual heat exchange tubes, supports therefor, the top and bottom portions of the reactor of FIGS. 1 and 2, inlets and outlets for the heat exchange fluid, valves, pressure controllers, pressure relief valves, thermocouples, gas distributors, and the like.

Figure 1:
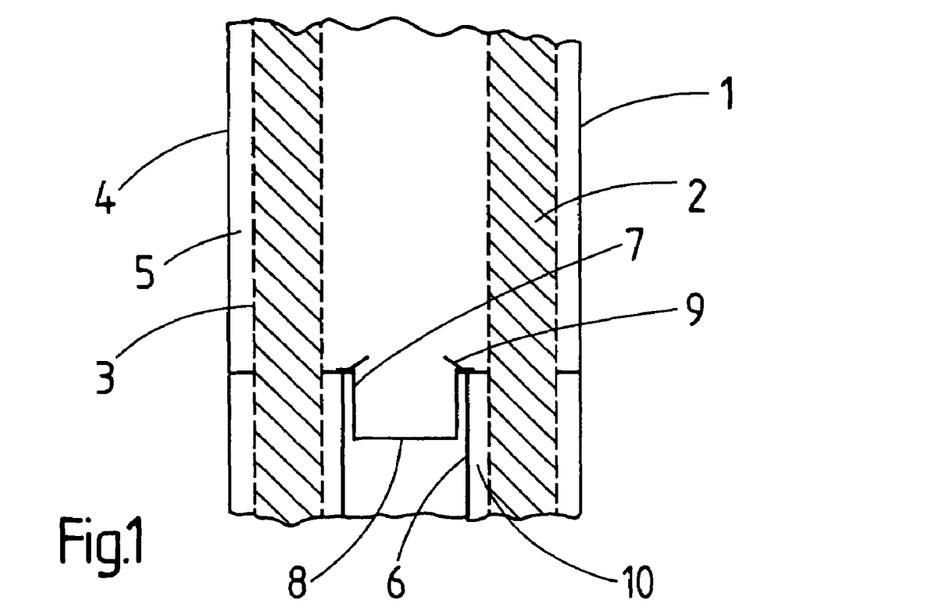
FIG. 1 is a vertical section through a radial flow reactor, for example a radial flow methanol synthesis reactor, which contains a multiplicity of heat exchange tubes, at an early stage in the course of being filled with a frangible particulate catalysts, e.g. a methanol synthesis catalyst.
Figure 2:
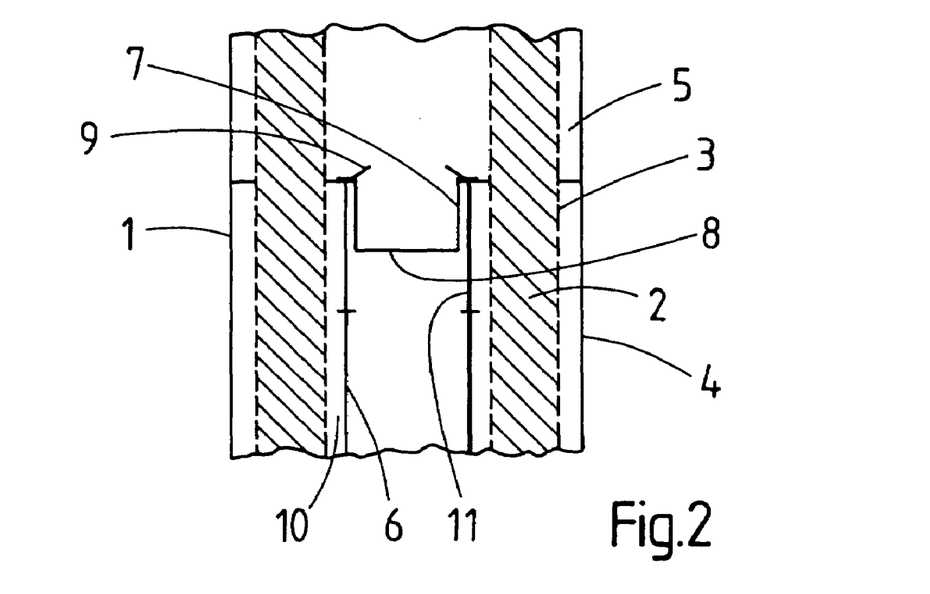
FIG. 2 is a similar vertical section through the reactor of FIG. 1 showing a later stage of the loading procedure.
Figure 3:
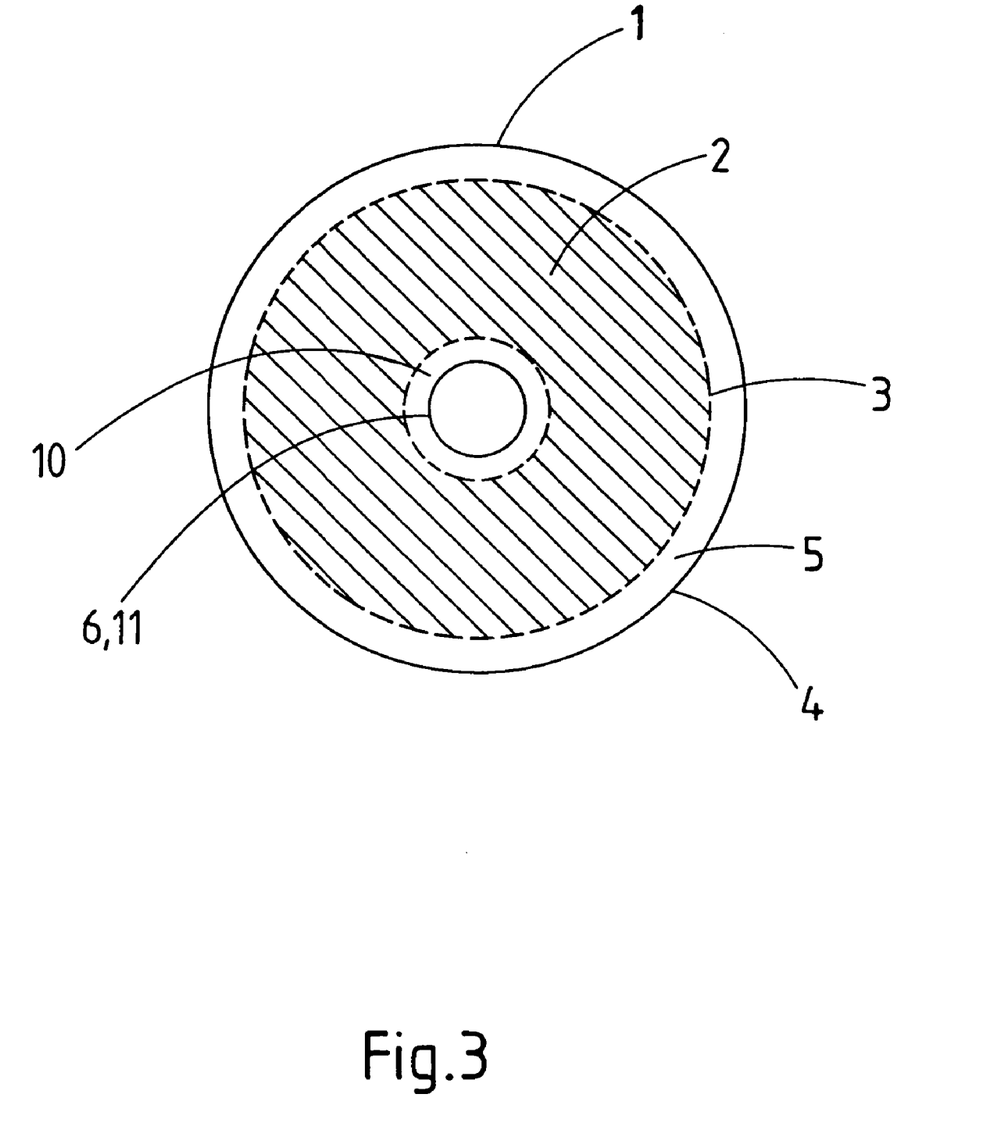
FIG. 3 is a horizontal cross section of the reactor of FIGS. 1 and 2.

Referring to FIGS. 1 to 3 of the drawings, a radial flow reactor 1 includes an annular zone 2 containing a plurality of heat exchange tubes with spaces between them which are to be filled with the catalyst. These heat exchange tubes are connected to appropriate inlet and outlet headers (not shown) for introduction and removal of heat exchange fluid. The heat exchange tubes extend between an upper partition (not shown) which defines an upper end to a catalyst containment zone and a lower partition (also not shown) which defines a lower end to the catalyst containment zone. The outside of annular zone 2 is bounded by an outer perforate screen 3 which defines between it and an outer wall 4 of reactor 1 an annular feed passage 5 for synthesis gas. Screen 3 also serves to retain the granules of catalyst within annular zone 2.

At the beginning of the loading procedure, a first substantially vertical open topped conduit portion 6 is set up on the bottom of the catalyst containment zone. This first conduit portion 6 has a perforate or other form of foraminous wall and a horizontal cross section to accommodate at least the feet and legs of an operative's body. It may be, for example, from about 18 inches (about 0.46 metres) to about 24 inches (about 0.61 metres) in diameter. The height of this conduit portion is preferably no more than about 10 feet (about 3.05 metres), and is typically less than about 6 feet (about 1.83 metres).

A bucket like filling platform 7 is set up on the uppermost end of conduit portion 6. This includes a floor 8 upon which an operative can stand during the next stage of the procedure; this floor 8 is positioned so that with the operative's feet and legs within the bucket like platform 7, yet the upper part of his body, typically from about the waist upwards, projects out of the top thereof. Platform 7 also includes a frustoconical deflector shield 9 whose narrower end lies uppermost. This deflector shield 9 is intended substantially to obviate the risk of catalyst granules entering platform 7 as the reactor 1 is filled with the catalyst charge.

When the operative is standing on the floor 8, a sock (not shown) containing catalyst is lowered to him through an open orifice at the top of the reactor 1. This sock can be provided at its lower end with a chute (also not shown) which is sufficiently narrow to pass through radial gaps between the heat exchange tubes to facilitate even loading of the catalyst granules within zone 2. The operative can then manoeuvre the bottom end of the catalyst filled sock and any chute attached thereto so as to cause catalyst granules to enter the annular zone 2 and fill up the spaces between the individual heat exchange tubes. In the course of this procedure he can use a rake, as necessary, in order to level the surface of the already poured catalyst or to ensure that it is evenly distributed in the spaces between the heat exchange tubes. Since he is positioned in close proximity to the surface of the catalyst as it is filled into the reactor, it is easy for him to ensure that the catalyst is evenly filled into the spaces in the annular zone 2 between the individual heat exchange tubes, their supports, and any baffles or gas distributors present, as well as into the annular space 10 surrounding conduit portion 6. The height of the conduit portion 6 and the position of floor 8 are chosen such that the operative can readily supervise closely the loading of the catalyst into the zones 2 and 10 without allowing the catalyst granules to fall through a free fall height sufficient to damage a significant proportion of the catalyst granules. If the catalyst is readily frangible, then it may be necessary to reduce the height of the conduit section 6 so as to reduce the risk of damage to the catalyst granules.

Loading is discontinued before the upper surface of the loaded catalyst reaches the top of platform 7. The sock together with any associated chute is then preferably withdrawn from the reactor 1 or, if more appropriate, moved to one side.

The operative then vacates platform 7 which is raised to permit a further conduit portion 11 to be fitted on top of the open upper end of conduit portion 6. Conduit portion 11 can be provided with a male end portion which fits inside a female socket provided on conduit portion 6 or conduit portion 11 can have a female socket which fits on a male top end of conduit portion 6. Alternatively conduit portion 11 can be bolted or welded to conduit portion 6.

The platform 7 can then be replaced on top of conduit portion 11 to permit the operative to take up his position therein standing on floor 8, before the catalyst filled sock is, if necessary, again lowered to him through the open orifice in the top of reactor 1 to permit him to load more catalyst into the annular zones 2 and 10 up to the top of conduit portion 11.

This procedure can be repeated as necessary until the full catalyst charge has been loaded into reactor 1.

Since the conduit portion 6, 11 etc. are perforate or otherwise foraminous, they can together form an outlet passage for reaction product mixture. In this case the annular space 10 can act as an adiabatic reaction zone.

Those skilled in the art will readily recognise that, if desired, the conduit formed by conduit portions 6, 11 etc. can alternatively be used as the feed passage for synthesis gas while annular passage 5 is used as an outlet passage for reaction product mixtures.

Instead of providing a separate filling platform 7 it is alternatively possible to provide conduit portions 6, 11 etc. each with an integral floor positioned at a height corresponding substantially to the height of floor 8 with respect to conduit portion 6, 11 etc. Such a floor would be perforate; for example, it could be made of expanded metal mesh. The conduit portions 6, 11 etc. could also be provided in this case, if desired, with an integral deflector shield similar to shield 9. In this case the integral floor and integral deflector shield would remain in place after the reactor has come on stream.

Figure 4:
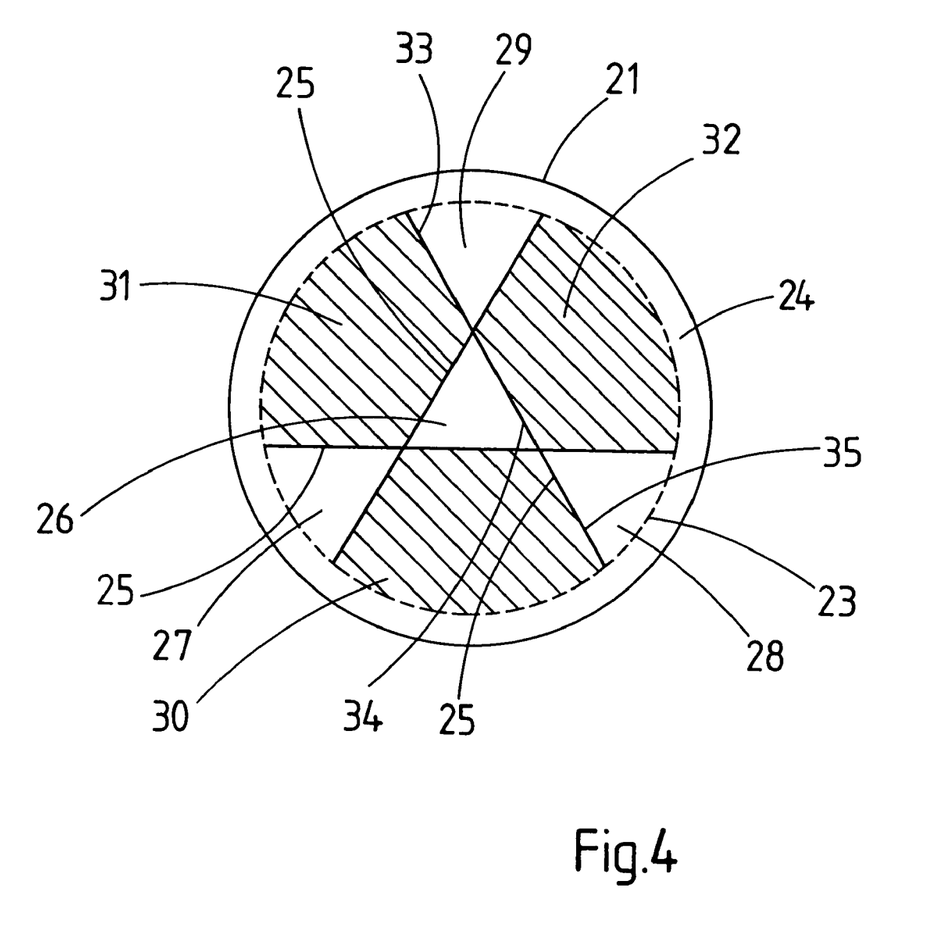
FIGS. 4 to 6 show horizontal cross sections through alternative designs of reactor.

FIG. 4 is a horizontal cross section of an alternative form of reactor 21 with an outer wall 22 an outer screen 23 which defines with the outer wall 22 an annular inlet passage 24 for synthesis gas. The space inside outer screen 23 is divided by vertical baffles 25 so as to form a central triangular section space 26 and empty spaces 27, 28, 29. Reference numerals 30, 31, 32 indicate zones provided with vertical heat exchange tubes (not shown) for filling with catalyst by the method of the invention. Such zones are substantially circularly trapezoidal in horizontal section; in other words they have substantially the shape in cross section of a trapezium with an arcuate convex side in place of one of the parallel sides of a trapezium.

Vertical baffles 25 are formed by erecting one on top of another portions which are typically no more than about 10 feet (about 3.05 metres) and are preferably from about 4 feet (about 1.22 metres) to about 8 feet (about 2.44 metres), for example about 6 feet (about 1.83 metres) in height. These sections can be built up to form the baffles 25 during the loading of the catalyst, in a similar manner to the way in which catalyst is charged and conduit portions 6, 11 are erected as described in relation to FIGS. 1 to 3, so as to form triangular section central core 26.

In an alternative embodiment, each baffle 25 is made in three portions 33, 34, 35. The portions 33 and 35 extend from top to bottom of the catalyst containment zone and then portions 34 are built up and catalyst is introduced into zones 30, 31, 32 in a similar manner to that described for conduit portions 7, 12 so as to form the central core with its empty space 26.

Figure 5:
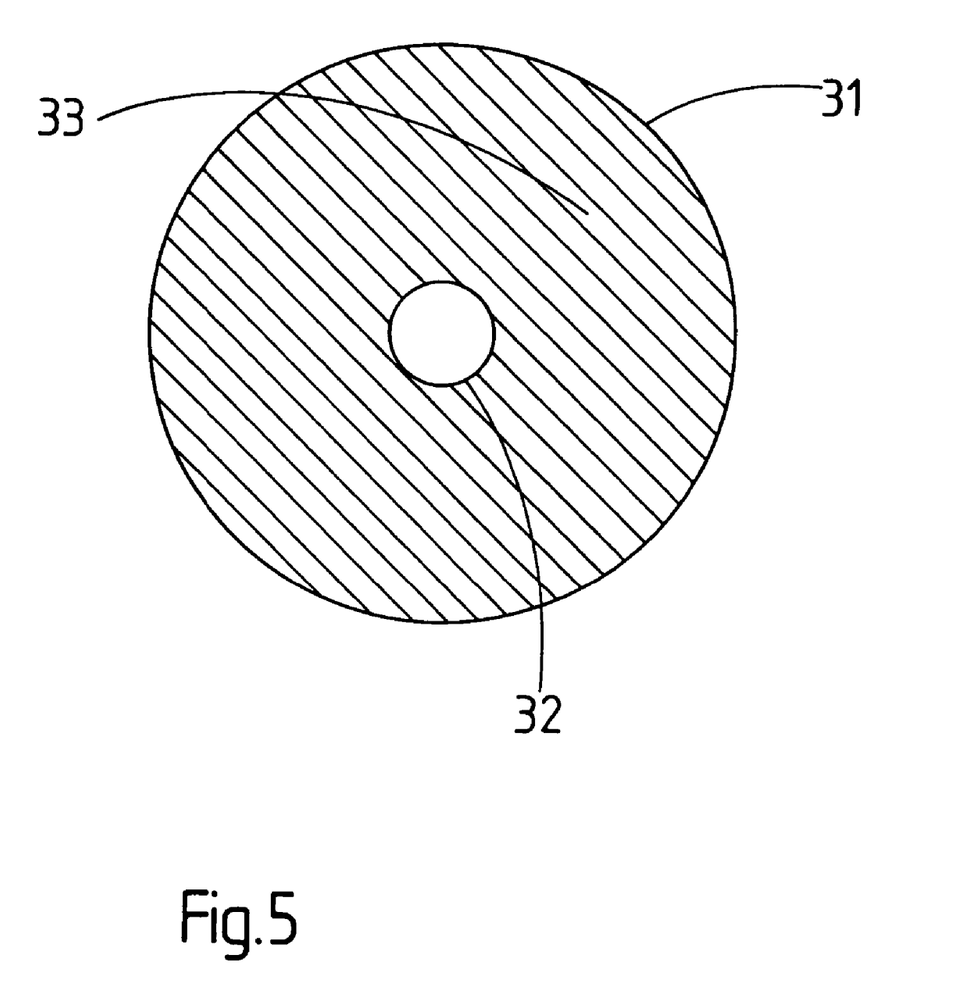

FIG. 5 is a horizontal cross section of an axial flow methanol synthesis reactor 31 with a central core 32 built up from conduit sections similar to conduit sections 6 and 11 of FIGS. 1 to 3. Reference numeral 33 indicates the catalyst containing zone which contains vertical heat exchange tubes. (The individual heat exchange tubes are not shown). In reactor 31 there is no outer screen corresponding to screen 3 of the reactor of FIGS. 1 to 3.

Figure 6:
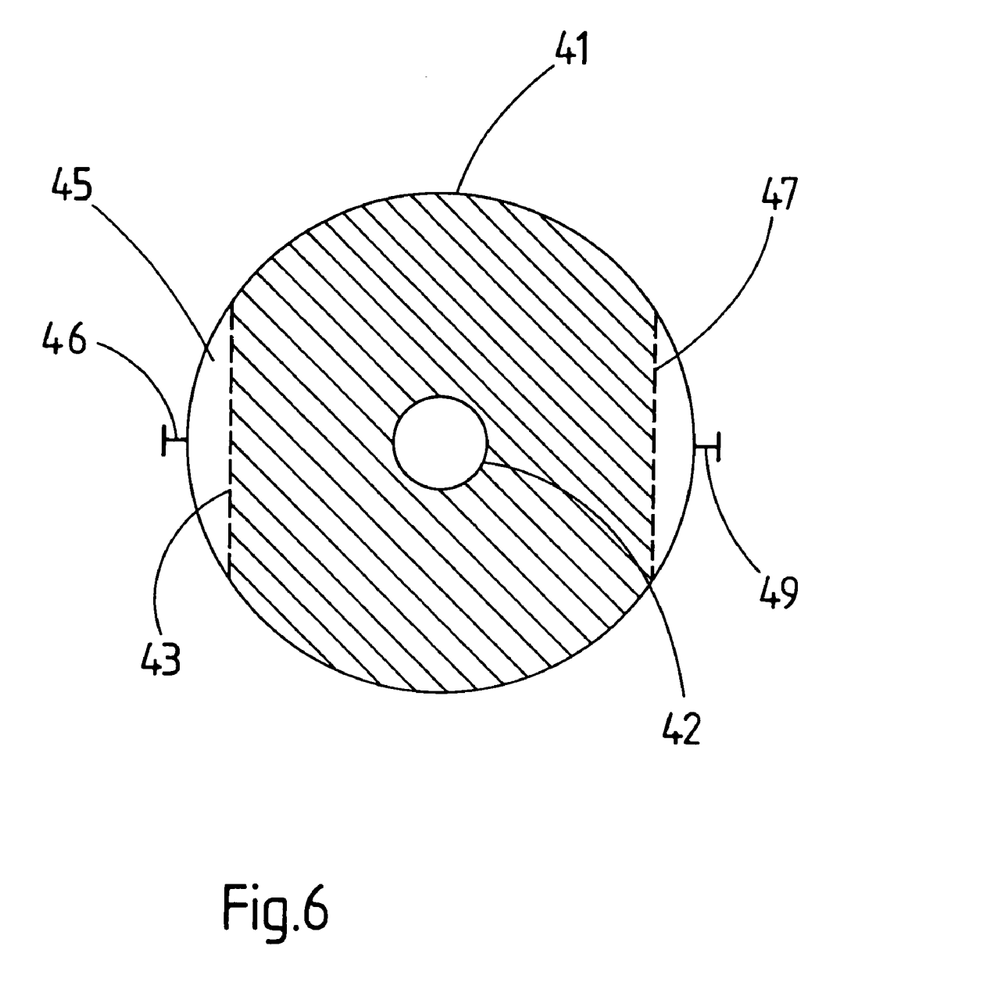

FIG. 6 is a horizontal cross section of a cross flow reactor 41. Its central core 42 is built up from conduit sections similar to conduit sections 7 and 12 of FIGS. 1 and 2. Zone 42 is filled with vertical heat exchange tubes (not shown individually). Perforate screen 43 divides zone 44 from an inlet passage 45 for synthesis gas which is supplied from inlet 46. Perforate screen 47 divides zone 44 from an outlet passage 47 for reaction product mixture which can then exit reactor 41 via outlet 49. By use of the method of the invention the space within zone 42 around the heat exchange tubes is filled with granules of a methanol synthesis catalyst.

Although the invention has been illustrated in relation to loading of a granular methanol synthesis catalyst into a methanol synthesis reactor, it will be appreciated that the scope of the invention is not limited to such an application but can be applied to loading of any frangible granulated solid into a vessel. Thus the teachings of the invention can equally be applied to loading of ammonia synthesis catalysts, hydrodesulphurisation catalysts, desulphurisation media (such as zinc oxide), ion exchange resins, absorbents, adsorbents, and the like into reactors of any desired shape, including not only circular section vessels but also vessels of square or hexagonal horizontal cross section.

The benefits of the invention can be further appreciated by considering the following Table which sets out dimensions for different designs of an axial flow reactor of substantially circular cross section. In this Table the core volume is the volume occupied by a central axial conduit formed by the method of the invention from a plurality of conduit portions, each of horizontal cross section and having a radius of about 300 mm.

TABLE

| | Example No. | | | | | |
| --- | --- | --- | --- | --- | --- | --- |
| | 1 (Comparative) | 2 | 3 | 4 (Comparative) | 5 | 6 |
| Catalyst volume m$^3$ | 100 | 100 | 100 | 200 | 200 | 200 |
| Tube volume m$^3$ | 20 | 20 | 20 | 40 | 40 | 40 |

TABLE-continued

|  | Example No. | | | | | |
| --- | --- | --- | --- | --- | --- | --- |
|  | 1 (Comparative) | 2 | 3 | 4 (Comparative) | 5 | 6 |
| Core volume m$^3$ | — | 3 | 6 | — | 3 | 6 |
| Free fall height m | 10 | —[1] | —[1] | 10 | —[1] | —[1] |
| Catalyst bed height m | 10 | 10 | 20 | 10 | 10 | 20 |
| Diameter m | 3.91 | 3.96 | 2.83 | 5.53 | 5.56 | 3.96 |

Notes:
[1] indicates that free fall height is not a factor that limits the height of the reactor.

The invention claimed is:

1. A method of loading a granulated solid into a vessel having a containment zone for the granulated solid, the method comprising:
   (a) providing in a bottom portion of the containment zone a first substantially vertical rigid columnar portion having a horizontal cross section large enough to accommodate an operative's body;
   (b) providing support means associated with the substantially vertical rigid columnar portion upon which an operative can stand within the substantially vertical rigid columnar portion to supervise at close hand loading of the containment zone with the granulated solid;
   (c) charging granulated solid into the containment zone under control of an operative standing on the support means within the rigid columnar portion so as to distribute granulated solid around the substantially vertical rigid columnar portion;
   (d) discontinuing charging of the granulated solid into the containment zone before the upper surface of the granulated solid in the containment zone reaches the top of the substantially vertical rigid columnar portion;
   (e) positioning on top of the first columnar portion a further substantially vertical rigid columnar portion having a similar horizontal cross section to that of the first rigid columnar portion, thereby forming with the first columnar portion a substantially vertical conduit within the reactor; and
   (f) repeating steps (b) to (e) a sufficient number of times until the desired amount of granulated solid has been charged to the containment zone.

2. A method according to claim 1, in which the rigid columnar portions each have a height of less than about 10 feet.

3. A method according to claim 2, in which the rigid columnar portions each have a height of about 6 feet.

4. A method according to claim 1, in which the vessel is an axial flow reactor.

5. A method according to claim 1, in which the vessel is a radial flow reactor.

6. A method according to claim 1, in which the vessel is an annular flow reactor.

7. A method according to claim 1, in which the vessel is a cross flow reactor.

8. A method according to claim 1, in which the vessel is a segmental flow reactor.

9. A method according to claim 1, in which the vessel is a reactor selected from an axial flow reactor, a radial flow reactor, an annular flow reactor, a cross flow reactor, a segmental flow reactor, and a combination of two or more thereof.

10. A method according to claim 1, in which the rigid columnar portions are substantially circular in horizontal cross section.

11. A method according to claim 1, in which the rigid columnar portions have an imperforate wall so as to form a gas impermeable columnar extending substantially from the bottom to the top of the containment zone.

12. A method according to claim 1, in which the rigid columnar portions are hollow and have a perforated or foraminous wall so as to form a gas permeable conduit extending substantially from the bottom to the top of the containment zone.

13. A method according to claim 1, in which step (c) comprises providing a flexible conduit having a feed end and a delivery end, feeding granulated solid through the delivery conduit from the feed end to the delivery end, and manually directing the delivery end so as to discharge granulated solid to a desired location outside the respective rigid columnar portion.

14. A method according to claim 13, in which the rigid columnar portions are hollow and in which in step (c) a deflector shield is fitted to the top of the uppermost rigid columnar portion to prevent granulated solid falling into the respective rigid columnar portion.

15. A method according to claim 13, in which in step (c) a frusto-conical deflector shield is fitted to the top of the uppermost rigid columnar portion with the narrower end of the deflector shield uppermost.

16. A method according to claim 1, in which the containment zone contains internal furniture selected from heat exchange tubes, supports therefor, distributors, and baffles.

17. A method according to claim 1, in which the granulated solid is a granulated catalyst.

18. A method according to claim 17, in which the catalyst is a methanol synthesis catalyst.

* * * * *